Dec. 24, 1968  C. W. MORRIS  3,417,562
SELF-LUBRICATING AIR SEALED BEARING APPARATUS
Filed Oct. 26, 1966  2 Sheets-Sheet 1
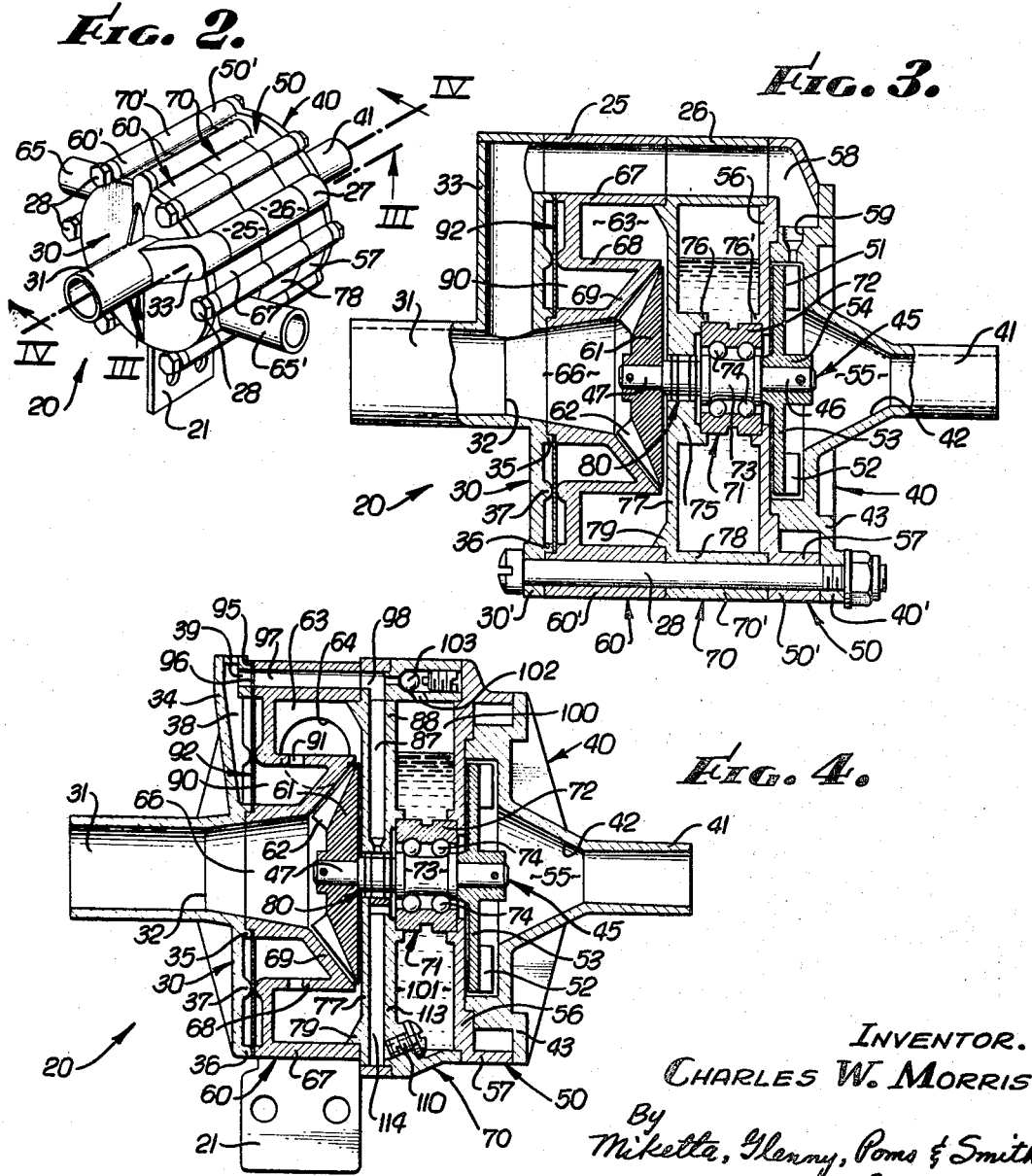
INVENTOR.
CHARLES W. MORRIS
By Miketta, Glenny, Poms & Smith
ATTORNEYS.

Dec. 24, 1968   C. W. MORRIS   3,417,562
SELF-LUBRICATING AIR SEALED BEARING APPARATUS
Filed Oct. 26, 1966   2 Sheets-Sheet 2
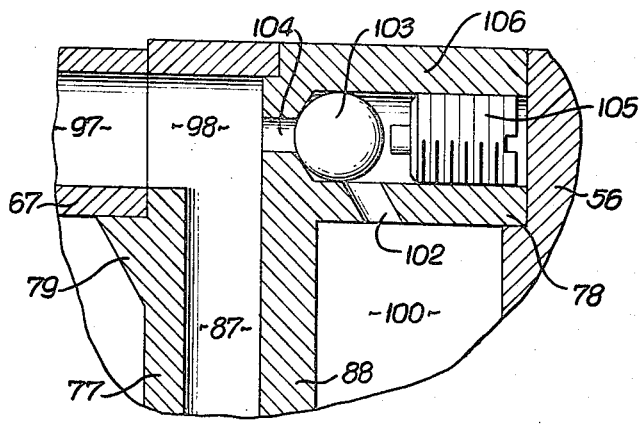
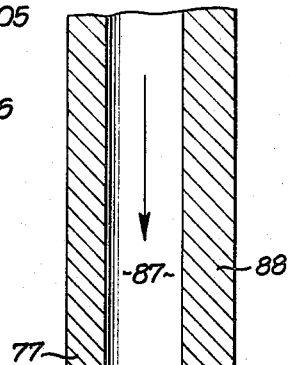
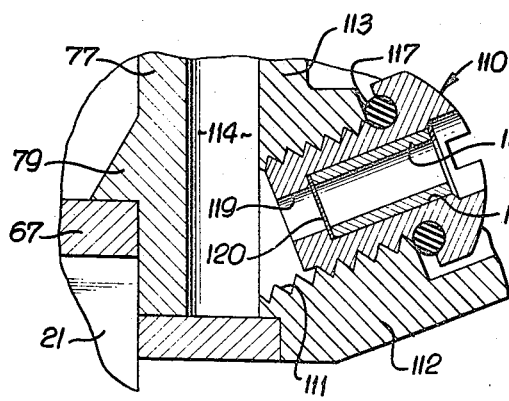
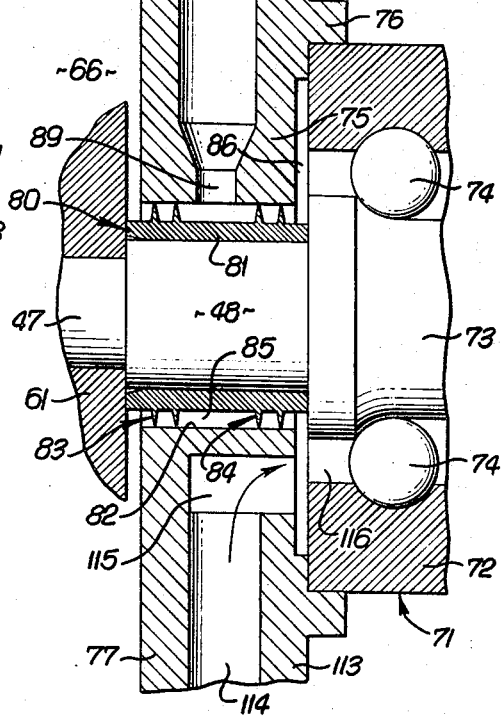
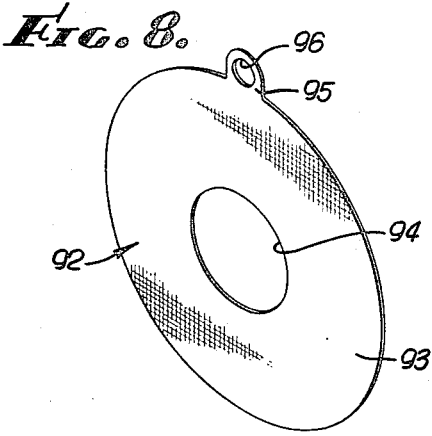
INVENTOR.
CHARLES W. MORRIS
By Miketta, Glenny, Poms & Smith
ATTORNEYS.

3,417,562
SELF-LUBRICATING AIR SEALED
BEARING APPARATUS
Charles W. Morris, 11769 Chenault St.,
Los Angeles, Calif. 90049
Filed Oct. 26, 1966, Ser. No. 589,571
19 Claims. (Cl. 60—30)

ABSTRACT OF THE DISCLOSURE

A self-lubricating air sealed bearing apparatus for use in rotatably mounting a shaft extending between two zones of different air pressure within a housing. The bearing is sealed against passage of air from the higher to the lower pressure zone to prevent contamination of the bearing by such air flow. The bearing is continuously and effectively self-lubricated during operation in response to the zone pressure differential.

---

This invention relates in general to a bearing apparatus for use in rotatably mounting a shaft therein with means for continuously providing lubricant oil to the bearing apparatus while sealing it from the contamination of surrounding ambient air. More particularly, the present invention is directed to a self-lubricating air sealed bearing apparatus adapted to be used in rotatably mounting a shaft extending between two areas, zones or chambers having different air pressures and means for utilizing the pressure differential between such areas, zones or chambers for inducing continuous self-lubrication of the bearing while sealing it off from possible contamination due to air flow from the higher pressure area, zone or chamber to the lower pressure area, zone or chamber.

The self-lubricating air sealed bearing apparatus of the present invention has been developed for and is particularly adapted for use in the combination air motor and blower unit of the co-pending application Ser. No. 424,546 filed Jan. 11, 1965 entitled "Self-Regulating Exhaust Control System." Such combination air motor and blower unit has been previously developed and used in connection with the operation of internal combustion engines to provide additional air to the engine exhaust system to facilitate the operation of afterburner or other devices for the treatment of unburned hydrocarbons and other pollutants in the exhaust gases. The motor section of such unit is operated by the pressure differential between the atmospheric pressure at the air filter of the internal combustion engine and the lower absolute pressure or vacuum of the intake manifold to the engine. The motor unit in turn drives a blower unit which blows air received from the automobile filter out of the unit and into the engine exhaust gas system. A main shaft within such unit mounting the respective operating parts of the motor and blower unit has been found to reach rotative speeds in the range from 35,000 to 50,000 r.p.m. The unit is also subject to vibrations from the adjacent automotive engine and the bearing means mounting the high speed rotating shaft are subjected to rapid changes in bearing loads. These changes in loading tend to cause changes in the path of the bearing balls within the channels of the inner and outer bearing races of the conventional bearing means provided. This in turn produces a marked change in the rotational axis of each ball with each cycle of the input vibrations. This produces a condition referred to as bearing swirl which is accompanied by some form of sliding contact between the ball and the race.

All ball bearings can endure the above described swirl condition for a short span of life, but they will wear and fail at a life span which is largely dependent upon the supply of adequate lubricant between the contacting surfaces of the balls and races. Grease lubricants are only satisfactory to prevent such bearing wear for shaft speeds at low relative r.p.m. rates and are generally unsuitable under conditions existing in ball bearings having rotative speeds above 25,000 r.p.m. Since the operating speeds of the main shaft within the combination air motor and blower of the co-pending application Ser. No. 424,546 may be anywhere from 35,000 to 50,000 r.p.m. during operation thereof, a constant adequate oil lubricant supply is an absolute necessity in order for the unit to have an acceptable expected life span. However, the vibration of the entire assembly in conjunction with the high rotative speeds and its usual mounting adjacent an automotive engine causes the gradual loss of the lubricant oil originally provided within the bearing, necessitating the constant and frequent replacing of the oil in order to prevent failure of the bearing means within the unit.

Under conditions of actual use, the combination air motor and blower unit of the previously identified application Ser. No. 424,546 it has been found that dirt and other contaminants carried by the air entering the unit from the automobile air filter found its way into the bearing means and because of the aforedescribed gradual loss of oil, the bearing would fail within approximately 200 hours operating time, or around 4,000 miles of automobile driving, unless the bearing means was cleaned of such contamination and replenished with a clean oil supply.

It is an object of the present invention to provide a lubrication system and a means for preventing the contamination of the bearing means which will lengthen the operating life span of such unit to about 5,000 hours without the need for any service attention whatsoever. Such life span for commercially available ball type bearings can be expected only if the bearing is completely protected from any particulate contamination (very fine dust particles) and is continuously and constantly supplied with additional amounts of clean lubricating oil.

It is therefore the primary object of the present invention to provide a self-lubricating air sealed bearing apparatus for use in rotatably mounting a shaft extending between two areas, zones or chambers of different air pressures wherein the bearing apparatus is sealed off from the passage of air from the higher to the lower pressure areas, zones or chambers to prevent contamination thereof due to air flow through the bearing apparatus and which is continuously and effectively self-lubricating during its operation in response to the pressure differential between the two areas, zones or chambers.

It is an object of the present invention to disclose and provide a self-lubricating air sealed bearing apparatus as in the foregoing object for use in the combination air motor and blower unit of the co-pending application Ser. No. 424,546 which will sufficiently protect the bearing means thereof from particulate contamination and will constantly replace the oil lubricant with clean oil during operation such that the operating life expectancy of such unit can be extended to approximately 5,000 hours without the need for any service attention.

It is another object of the present invention to provide a bearing apparatus as in either of the foregoing objects wherein an air sealing means associated therewith is provided with a buffering cleaned air supply therein to buffer the passage of air from the high pressure area, zone or chamber thereby and which will provide a supply of clean air which can leak through the bearing means causing gradual removal therefrom of the constantly replenished lubricating oil.

It is a still further object of the present invention to disclose and provide a bearing apparatus as in the foregoing objects wherein the supply of lubricant oil for the bearing apparatus is contained within the housing or unit mounting the bearing apparatus and wherein the flow of lubricant oil from such supply to the bearing apparatus is controllably restricted to a predetermined desired flow rate.

It is another object of the present invention to disclose and provide a combination air motor and blower unit operated by the pressure differential between an associated engine intake manifold vacuum and atmospheric pressure wherein a single main shaft therein mounting a turbine means at one end within a sub-atmospheric pressure zone and a blower means at the other end of the shaft in a generally atmospheric pressure zone is rotatably mounted by a self-lubricated bearing means including a bearing assembly between the zones, a lubricant supply chamber for communicating lubricant to the bearing assembly and means for communicating the lubricant oil to such bearing means in response to the presence of a pressure differential between said zones occurring when the air motor and blower unit is operating.

It is another object of the present invention to disclose and provide a combination air motor and blower unit as in the foregoing object wherein the bearing assembly is provided with an air sealing means on the shaft between the bearing and the atmospheric pressure zone to protect the bearing assembly from contamination thereby and wherein such sealing means are provided with clean air under pressure in a central portion thereof to buffer air flow from said atmospheric pressure zone while providing clean air therein to leak toward said sub-atmospheric pressure zone.

These and various other objects as well as the many advantages of the self-lubricating air sealed bearing apparatus of the present invention will become apparent to those skilled in the art from a consideration of the following detailed explanation of an exemplary embodiment thereof, such exemplary embodiment being illustrated in use in an exemplary combination air motor and blower unit adapted to be employed with an internal combustion engine for supplying filtered air into the automobile exhaust system. Reference will be made to the appended sheets of drawings in which:

FIG. 1 is a simplified side elevation of an internal combustion engine provided with an exemplary form of combination air motor and blower unit, indicated generally at 20;

FIG. 2 is an enlarged perspective view of the exemplary combination air motor and blower unit of FIG. 1;

FIG. 3 is a further enlarged sectional view of the exemplary air motor blower unit of FIG. 2 taken therein along the plane III—III showing an exemplary embodiment of self-lubricating air sealed bearing apparatus in accordance with the present invention;

FIG. 4 is a sectional view of the exemplary embodiment of combination air motor and blower unit of FIG. 2 taken therein along the plane IV—IV showing the exemplary embodiment of self-lubricating air sealed bearing apparatus of FIG. 3 and according to the present invention;

FIG. 5 is a detail view of a portion of the exemplary embodiment of FIG. 4 showing a ball type check valve at the inlet to a lubricant oil supply chamber;

FIG. 6 is a detail section view of a portion of the exemplary embodiment of FIG. 4 illustrating an exemplary form of membrane oil flow restrictor;

FIG. 7 is an enlarged detail section view of a portion of the exemplary embodiment of FIG. 4 showing an exemplary embodiment of air sealing means between a high pressure zone 66 and an exemplary conventional bearing means, indicated generally at 71; and FIG. 8 is a perspective view of an exemplary membrane air filter employed in the exemplary embodiment of the apparatus in accordance with the present invention as illustrated in FIGS. 3 and 4.

Referring now to the drawings, a detailed explanation will be made of a preferred exemplary embodiment of the self-lubricating air sealed bearing apparatus, of the present invention, in a combination air motor and blower unit to be employed with an internal combustion engine to supply additional air to selected locations in the engine exhaust system. The general operation and function of the air motor and blower unit, of the present exemplary embodiment, is similar to that disclosed in the co-pending application Ser. No. 424,546 filed Jan. 11, 1965 entitled "Self-Regulating Exhaust Control System." While it is contemplated that the self-lubricating air sealed bearing apparatus of the present invention can be used in other environments than the combination air motor and blower unit hereinafter disclosed, it has been found that the apparatus of the present invention is particularly well suited for use in the specific air motor-blower construction of the prior application Ser. No. 424,546.

As shown in FIG. 1, the exemplary combination air motor and blower, indicated generally at 20, is disclosed in use in a system including an internal combustion engine, indicated generally at 10, such engine having an intake manifold 11 and a conventional carburetor, indicated generally at 12. Such carburetors usually include a throttle valve (indicated at 13) above the manifold 11 and a choke (indicated at 14) below a conventional air filter 15. The exhaust system of the engine may include the exhaust valve chambers in the head of the engine, an exhaust gas manifold 16, exhaust pipe 17 and any suitable type of muffler or device 18 for treating exhaust gases to facilitate the combustion, removal or elimination of hydrocarbons and pollutants therefrom which may be discharged from the engine.

The exemplary combination air motor and blower unit, indicated generally at 20, may be mounted to the engine by a bracket 21 in any suitable location to function during the operation of the engine to introduce additional air from the filter 15 into the exhaust gas system in response to the pressure differential between intake manifold 11 vacuum and the approximate atmospheric pressure within the air filter 15. Air at approximately atmospheric pressure is drawn from the air filter 15 through the air supply line 22, through the combination air motor and blower unit, indicated generally at 20, into the intake manifold 11 by way of the air conduit 24. As hereinafter explained, the air passing from the filter 15 to the intake manifold 11 operates the motor section, indicated generally at 50, of the unit to drive a blower section, indicated generally at 60, to supply a portion of the air entering the unit to the exhaust gas system by way of the air conduit 23. The amount of air added to the exhaust system by way of air conduit 23 varies inversely to the absolute pressure within the intake manifold 11; the motor section, indicated generally at 50, operating more rapidly to blow air into the exhaust system as the absolute pressure drops in the intake manifold 11 relative to the generally atmospheric pressure at filter 15.

In accordance with the present invention, the motor section, indicated generally at 50, and the blower section, indicated generally at 60, are separately provided within a housing including a central self-lubricating air sealed bearing section, indicated generally at 70, and end bells or caps, indicated generally at 30 and 40.

Referring now to FIG. 3, the exemplary air motor and blower unit, indicated generally at 20, is provided with a front cap or end bell 30 having an inlet connector 31 to connect to the air supply line 22 delivering filtered air at approximately atmospheric pressure from the air filter 15. The inlet connector 31 narrows slightly to a reduced cross-section or entrance 32 to an inlet chamber 66 of the blower unit, indicated generally at 60, chamber 66 being at approximately ambient pressure.

Rear end cap or end bell cover 40 is provided with a tubular outlet or connector 41 adapted to be connected to the air conduit 24 leading to the intake manifold 11. The outlet connector 41 is an extension of a generally frustoconical housing 42 on the end bell integral with the end bell peripheral flange 43. A low pressure or spent air chamber 55 is thus provided which is exposed to and approaches the low pressure or vacuum of the intake manifold 11 to which it is connected by way of the air conduit 24. A main shaft 45 for mounting the motor unit turbine and the air blower is provided within the unit with its opposite ends exposed to the high pressure of inlet chamber 66 and the low pressure of outlet or spent air chamber 55, respectively.

The motor unit section, indicated generally at 50, includes a turbine 51 mounted upon a reduced portion 46 of the main shaft 45. Buckets 52 are provided on a runner 53 which is mounted by the integral hub 54, the hub being mounted on and pinned to the shaft portion 46. The motor unit section also includes a partition wall 56, having outer flange 57, which cooperates with the rear end bell or cap 40 to enclose turbine 51 within the low pressure or spent air chamber 55.

The air motor, including turbine 51, is operated by the passage of air from the high pressure zone of blower entrance 32 and inlet chamber 66 to the low pressure zone of the chamber 55. As best seen in FIG. 3, air at approximately atmospheric pressure may pass from the blower entrance at 32 upwardly through the air motor supply passage 33 formed in the front end bell or plate 30, through the air header or conduit 25 formed in the blower section, indicated generally at 60, through the air header or conduit 26 formed in the bearing section, indicated generally at 70, and into the air header or supply chamber 58 of the motor unit section where it is directed through the nozzle 59 against the buckets 52 of the turbine.

The operation of turbine 51 by the passage of air through the motor section, as above described, causes consequent rotation of a blower mounted on the opposite end of the main shaft 45 within the blower section, indicated generally at 60. As best seen in FIG. 3, the blower 61 is mounted on and pinned to a reduced portion 47 of the main shaft 45 exposed to the blower inlet chamber 66. Radially extending vanes 62 on the blower 61 drive air from chamber 66 into an annular chamber or scroll 63 formed within the blower section. Scroll 63 is provided with a tangential discharge port 64 leading to a blown or driven air outlet connector 65. As best seen in FIG. 2, an alternative air outlet connector 65' may be provided in addition to the outlet 65 to facilitate the installation of the unit and its association with the exhaust system of the internal combustion engine by way of the air conduit 23. The connector not in use may be merely capped.

The blower inlet chamber 66 and scroll or discharge chamber 63 are formed within the blower section by an easily assembled partition wall including an outer circular flange 67 providing an outer surface for scroll chamber 63, an annular web 68 having a generally right angle cross-section and an inner annular web 69 having a two-part wall construction, a first part enclosing portions of the chamber 66 while the second part opposes the vanes 62 of the blower 61. The junction of the webs 68 and 69 adjacent the periphery of the blower 61 are spaced from the adjacent partition wall 77 of the bearing section, indicated generally at 70, to provide an air outlet from the blower means, provided by blower 61, vanes 62 and opposed wall of web 69, into the scroll 63. The air discharged from the scroll 63 may be directed into any desired portion of the exhaust gas system for the internal combustion engine, the discharge line 23 being illustrated as entering a section of the exhaust pipe 17 in FIG. 1.

Thus far, the combination air motor and blower unit of the present exemplary embodiment does not differ appreciably in function or operation from that disclosed in the co-pending application Ser. No. 424,546. However, as indicated previously, it has been found that the bearing assembly for this unit has not had a sufficiently long operative life because of the passage of air and foreign particles carried therewith from the high pressure zone or chamber 66 along the main shaft 45, through the bearing, toward the low pressure zone or chamber 55. Such contamination of the bearing assembly as well as the tendency for such air flow to remove and dissipate lubricating oil has prevented the unit from operating heretofore for a satisfactorily long period of time. As particularly contemplated within the present invention, and as hereinafter explained in detail, the self-lubricating air sealed bearing apparatus provided within the exemplary bearing section, indicated generally at 70, overcomes these prior defects or disadvantages in the prior unit.

Referring now to FIGS. 3 and 4, the bearing section, indicated generally at 70, includes a bearing means, indicated generally at 71, rotatably mounting the main shaft 45 extending between and exposed to the spaced high pressure chamber or zone 66 and low pressure chamber or zone 55 within the motor unit and blower housing. The bearing means, indicated generally at 71, includes an outer race 72, an inner race 73 and a plurality of balls 74 adapted to roll freely between the inner and outer race. Inner race 73 may be formed integrally with the main shaft 45. The outer race 72 is fixedly mounted within the bearing section in recesses or sockets 76 and 76' provided in the hub 75 of partition wall 77 and the spaced motor section partition wall 56, respectively. Bearing section wall 77 is provided with an outer annular flange 78 to fit or mate with a recessed portion of the partition wall 56 as seen in FIG. 3. An oppositely directed off-set flange 79 may be provided to fit or mate within the annular flange 67 of the blower section, indicated generally at 60. Each of the motor, bearing and blower sections are adapted to be easily assembled between the end caps and held in such assembled relation by the bolts 28 passing through the bored flanges 50', 70', 60' and 30' and 40', respectively, as best seen in FIGS. 2 and 3.

Air seal means are provided about the main shaft 45 engaging surrounding portions of the housing for sealing the bearing means, indicated generally at 71, off from the first or high pressure chamber or zone 63 within the blower section of the housing or unit. In the present exemplary embodiment, such air seal means are indicated generally at 80 in FIGS. 3 and 4 and are shown in somewhat more detail in FIG. 7, again indicated generally at 80 therein. Referring specifically to FIG. 7, the exemplary air seal means includes a tubular resilient material element securely mounted about an enlarged bearing portion 48 of the main shaft within a bore 82 provided by the surrounding hub 75 of the bearing section partition wall 77. A pair of spaced labyrinth type seals or sealing elements are mounted on the exterior of the tubular element 81 as indicated generallly at 83 and 84, contacting and sealing against the surrounding housing portion provided by the bore 82 of hub 75. The spaced labyrinth seals or sealing elements, indicated generally at 83 and 84 provide a central chamber 85 therebetween together with the outer surfaces of the element 81 therebetween and the surrounding housing surfaces provided by the bore 82.

As particularly contemplated within the present invention, the seal means of the present exemplary embodiment is provided with a source of clean air under pressure to pressurize the seal against the passage of air with contaminants from chamber 66 through the seal using the readily available sources of air pressure in the exemplary air motor and blower unit. As seen in FIG. 7, a chamber 86 formed between the bearing means and the hub 75 is open through the spaces between the inner and outer bearing races to the low pressure of the motor unit chamber or zone 55 causing the right hand side of the seal means, indicated generally at 80, in FIG. 7 to be exposed to the low absolute pressure or vacuum of the interconnected intake manifold. The left hand side of the seal means is exposed to the higher absolute pressure air of the blower chamber or zone 66 either about the blower 61 or along the main shaft itself. Chamber 85, as hereinafter explained, is provided with cleaned air to buffer the high pressure air from zone 66 and to supply clean air which may slowly leak into or toward the low absolute pressure or vacuum within the motor section spent air chamber or zone 55.

Referring to FIGS. 4 and 7, the exemplary bearing assembly section, indicated generally at 70, is provided with an inner air passage or conduit 87 formed between the partition wall 77 and an additional wall means 88 mounted thereto, passage 87 extending down through the hub 75 of partition wall 77 to the chamber 85 through a restricted opening 89. Cleaned air is supplied to the passage 87 from a chamber 90 within the blower section. I have found that dirt particles and other contaminants in the air entering the blower section from the air filter 15 tend to be thrown to the outer portions of the scroll or annular chamber 63 as the air therein passes toward the discharge port 64. I have therefore provided one or more outlets 91 from the scroll chamber 63 in the web 68 at the innermost portions of the scroll chamber 63 where the air is the cleanest. Because of the increased air pressure within the scroll chamber 63, the cleaner air adjacent the inner portions of the scroll chamber adjacent the horizontal wall portion of web 68 is forced through the outlets 91 into a clean blown air receiving chamber 90 formed between the blower section webs 68 and 69 and as best seen in FIG. 4. This clean blown air in chamber 90 is then passed through a membrane air filter 92 held in place between the forward end cap or bell 30 and the blower section.

Membrane air filter 92, as illustrated in FIG. 8, in the exemplary embodiment is a membrane material having a mean pore size of about 0.8 micron. Such membrane material may be fabricated out of nylon cloth with a generally circular body portion 93 having a central aperture 94 and a laterally extending tab 95 provided with port 96. As best seen in FIG. 4, the membrane air filter body is clamped between the end bell 30 and the blower section, inner flange 35, outer flange 36 and intermediate circular bead 37 of the outer bell 30 tightly clamping the filter body 93 against opposing mating portions of the blower section. A filtered blown air pressure chamber 38 is formed within the bell end 30 and is connected by a header portion 34 with the cleaned air passage 87 to the seal means, indicated generally at 80. The filtered clean blown air within the header 34 passes through an outlet 39 formed in the front end bell, through the port 96 of the membrane tab 95, through a passageway 97 formed in the blower section and into an inlet 98 to passage 87.

From the foregoing, it may be seen that when the combination air motor and blower unit is operated due to a pressure differential between the internal combustion engine intake manifold 11 and the atmospheric pressure at air filter 15 in the exemplary embodiment, the cleaner air at above atmospheric pressure within the scroll chamber 63 is drawn off into the chamber 90, passed through the membrane filter 92 and directed into the buffering clean air pressure chamber 85 of the exemplary seal means indicated generally at 80. This clean air is at a higher pressure than the approximate atmospheric pressure of inlet chamber 66 acting on the left end of the seal means as seen in FIG. 7. Because of this higher internal pressure, the clean air in chamber 85 buffers or prevents the passage of the less clean air from chambers 63 and/or 66 through the seal means toward the low absolute pressure or vacuum zone in the motor section chamber 55. Any leakage of air past the right hand sealing elements, indicated generally at 84 in FIG. 7 of the seal means into the chamber 86 and thence through the bearing assembly will be of the cleaned air supply to chamber 85. The bearing means is therefore less susceptible to being worn or rendered inoperative because of the introduction of contaminants, particularly dust and dirt in the air entering the unit because of passage of such air between the high pressure zone 66 and the low pressure or vacuum zone 55 at opposite ends of the main shaft 45 mounted within the bearing means.

In addition to assuring the exclusion of contaminated air from the bearing means, it is particularly contemplated within the present invention that the bearing means be continuously self-lubricating during the operation of the exemplary combination air motor and blower unit, such continuous lubrication being effected during the operation of the unit in response to the pressure differential between the high pressure zone or chamber 66 and the lower pressure or vacuum chamber or zone 55 of the unit. In the exemplary embodiment of combination air motor and blower unit, and as best seen in FIG. 4, the bearing section, indicated generally at 70 is provided with an internal lubricant supply chamber 100 formed by the surrounding walls 77 and 78 of the bearing section, partition wall 56 of the motor section and the outer race 72 of the bearing means. Chamber 100 is adapted to enclose and retain a supply a lubricating oil 101 within the housing or unit and in the exemplary embodiment, within the bearing section itself.

Lubricant supply or passage means communicating between the bearing means, indicated generally at 71, and the chamber 100 are provided in the exemplary embodiment as best seen in FIGS. 4, 6 and the lower portion of FIG. 7. Chamber 100 is provided with a port at a lower portion thereof for discharge of lubricating oil 101 into a passageway 114 extending vertically upwardly in FIGS. 6 and 7 to a generally horizontal passage 115 formed within the hub 75 and opening into the chamber 86 adjacent the left end of the bearing means, indicated generally at 71. As stated previously, chamber 86 is at a low absolute pressure or vacuum approaching that within the spent air chamber 55 connected to the engine intake manifold 11. The flow of lubricant oil from chamber 100 into the passage 114 toward this low absolute pressure area or zone is restricted by the provision of restrictor 110 inserted into the lubricant chamber outlet port as best seen in FIG. 6.

Restricter 110, as best seen in FIG. 6, is provided with an external thread and a slotted head for facilitating its being tightly screwed into the internally threaded outlet port 111 of the lubricant chamber 100, the port 111 being formed in an enlarged portion 112 of the bearing section flange 78 and the additional wall means 113 forming the passage 114 with wall 77. Restrictor 110 is adapted to controllably restrict the flow of lubricant oil from chamber 100 through passage 114 into the space 116 between the inner and outer race of the bearing means adjacent the bearing balls 74. In the exemplary embodiment, such controlled restriction of lubricant oil flow is provided by the provision of an O-ring seal 117 about the restrictor to prevent oil flow past the threaded connection with port 111 and the provision of a membrane oil filter 120 within and traversing the bore 118 of the restrictor. Membrane 120 is positioned across the bore 118 on a seat formed by a reduced bore portion 119 and is held thereon by a tubular retainer 121 pressed into the restrictor bore.

The rate of flow of lubricant oil through the restrictor 110 is dependent upon the pore size of the membrane 120 as well as the pressure differential between the interior of chamber 100 and the low absolute pressure or vacuum in the space 116 exposed through the bearing means to the engine intake manifold vacuum. In the present preferred exemplary embodiment, clean air under pressure is supplied to the interior of the lubricant chamber, as hereinafter described, in order to pressurize it, the pressure differential between chamber 100 and the space 116 amounting to between about 8 pounds per square inch, but frequently reaching 12 pounds per square inch when the exemplary motor blower unit is in operation. It has been found that the pore size of membrane 120 must be at least no more than 1.0 micron in order to maintain the lubricant oil flow rate through the restrictor to less than .001 cubic inch per hour under such pressure differentials. This flow rate assures continuous lubrication of the bearing means whenever the exemplary combination motor and blower unit is being operated in response to the engine intake manifold vacuum. Membrane filter elements with even still smaller pore sizes are desirable in order to limit the flow of lubricant oil to about .0002 to .0003 cubic inch per hour, which, in the exemplary embodiment, would cause the amount of lubricating oil originally applied to the exemplary bearing means, indicated generally at 71, to be replaced approximately once each hour of operation of the unit.

Lubricant chamber 100, in the exemplary embodiment, is pressurized by cleaned blown air emanating from the blower section, indicated generally at 160 during operation of the combination motor and blower unit. As best seen in FIGS. 4 and 5, lubricant chamber 100 is provided with an air inlet port 102 opening to the cleaned blown air supply chamber 98 through a ball type check valve including ball 103 adapted to seat against a valve port 104. Ball 103 is allowed limited travel by the stop 105 which is adjustably mounted by external threads within an internally threaded enlarged portion 106 of the bearing section flange 78. The ball type check valve thus provided prevents the loss of lubricant oil from within chamber 100 during shipment or storage of the unit prior to its installation in an upright position on its bracket 21 while allowing the passage thereafter of pressurized air from the supply chamber 98, receiving cleaned blown air as aforedescribed from the blower section, and allowing it to pass into and pressurize the interior of the lubricant chamber 100. The pressure within chamber 100 is thus maintained at or above atmospheric pressure while the absolute pressure at the bearing means approaches that within the low pressure zone 55 communicating with the engine intake manifold vacuum. When the motor and blower unit is being operated, the pressure within the lubricant chamber will rise to above atmospheric pressure at the same time the absolute pressure drops within chamber 55, the pressure differential between these chambers normally being between about 8 to 12 pounds per square inch. The continued supply of lubricating oil to the bearing means because of such pressure differential occurring when the unit is being operated assures that the bearing means, indicated generally at 71 will be self-lubricating during those times when the unit is operating and lubrication is necessary.

From the foregoing detailed description of an exemplary embodiment of the self-lubricating air sealed bearing apparatus of the present invention for use in rotatably mounting an exemplary air motor and blower unit associated with an internal combustion engine, it can be seen that the apparatus of the present invention satisfies the foregoing objects in providing a tank of lubricating oil completely protected from particulate contamination and which is adapted to supply lubricant oil to the bearing means at a flow rate induced by the pressure differential between the ambient atmospheric pressure at the unit inlet and the engine intake manifold vacuum at the unit outlet. The rate of lubricant oil flow is controllably limited by the restrictor to a desired flow rate of less than .001 cubic inch per hour by means of the membrane oil filter provided therein. The amount of oil thus induced by the aforedescribed pressure differential between intake manifold and ambient pressures is thus controlled to sufficiently small amounts to assure a continuous availability or supply of oil within the chamber for the expected long operating life of the unit.

The bearing means according to the present invention are not only self-lubricating during operation of the associated air motor and blower unit but are protected from contamination by the passage of air from the unit high pressure intake zone to the unit low pressure outlet zone. The seal means provided include means for pressurizing a central portion thereof with cleaned buffering air to prevent contaminated air from reaching the bearing means exposed to the low pressure or vacuum conditions within the unit outlet or spent air chamber. The clean air supply for pressurizing the seal and for pressurizing the associated lubricant oil chamber, according to the present invention, is obtained in a novel and very effective manner from the high pressure air source within the associated blower section of the air motor and blower unit. By providing the lubricant chamber with a capacity of approximately 1.75 cubic inches of oil, it is expected that the exemplary combination air motor and blower unit will have an expected operating life approaching 5,000 hours without the need for adding or changing oil or other otherwise expected service attention.

The foregoing detailed description of an exemplary self-lubricating air sealed bearing apparatus used in an exemplary form of combination air motor and blower unit is intended to be exemplary in character only and it should be understood that various modifications, alterations and embodiments thereof may be made within the scope of the present invention, which is defined and limited only by the following claims.

I claim:

1. A self-lubricating air sealed bearing apparatus for use in rotatably mounting a shaft within a housing having a first air pressure zone and a second lower absolute air pressure zone, said shaft having a first end exposed to said first zone and an opposite second end exposed to said second zone, said apparatus comprising:
    bearing means mounted within said housing between said zones for rotatably mounting said shaft with its first and second ends in said first and second zones;
    air seal means about said shaft and engaging surrounding portions of said housing for sealing said bearing means off from said first pressure zone within said housing;
    lubricant supply means within said housing and associated lubricant passage means communicating with a first end of said bearing means adjacent said seal means; and
    air passage means to said lubricant supply means for communicating air pressure from said first air zone to said lubricant supply means to cause lubricant flow from said supply means within said housing, through said lubricant passage means and through said bearing means toward said second zone.

2. A self-lubricating air sealed bearing apparatus as in claim 1 wherein:
    said seal means comprises a tubular body mounted about said shaft with a pair of spaced outwardly extending sealing portions providing an enclosed chamber therebetween within said surrounding housing portions; and
    seal pressurizing air passage means are provided for communicating between said seal means chamber and a source of air pressure at a pressure greater than that of said first air pressure zone for pressurizing said seal chamber.

3. A self-lubricating air sealed bearing apparatus as in claim 2 wherein:
    said lubricant passage means is provided with a bearing lubricant restrictor means for controllably restricting lubricant flow to said bearing means; and
    said air passage means to said lubricant supply means and said seal pressurizing air passage means are connected to the same source of air pressure.

4. A self-lubricating air sealed bearing apparatus as in claim 1 wherein:
    said housing is associated with an internal combustion engine and the engine exhaust gas system through a first air conduit connecting said second lower air pressure zone with the engine intake manifold, a second air conduit connecting said first air pressure zone with the engine air filter and a third conduit between said housing and said exhaust gas system;

said shaft mounts a turbine means at its second end in said second zone, said turbine means being driven by air flow from said first zone to said second zone through a turbine drive air passage, and said shaft mounts a blower means at its first end in said first zone which is driven by said turbine means for blowing air received from said filter out of said housing to said exhaust gas system through said third conduit; and said air passage means to said lubricant supply means is connected to air pressure supplied from said blower means whereby lubricant is supplied to said bearing means while said internal combustion engine is running in response to the air pressure differential between manifold absolute pressure on said bearing means and blower means air pressure on said lubricant supply means.

5. A self-lubricating air sealed bearing apparatus as in claim 4 wherein:

said seal means comprises a tubular body mounted about said shaft with spaced sealing portions providing a central seal chamber within said surrounding housing portions; and pressurized air passage means are provided for communicating air under pressure above atmospheric pressure from said blower means to said seal chamber to overcome air leakage through said seal means from said first air pressure means.

6. A self-lubricating air sealed bearing apparatus as in claim 5 wherein:

said blower means includes a blower wheel with radially extending vanes for blowing air from said first air pressure zone into a surrounding scroll chamber, said scroll chamber discharging through said third conduit to said exhaust gas sytem; and said pressurized air passage means from said blower means to said seal means includes a plurality of air outlet ports at a radially innermost portion of said scroll chamber for removing the cleanest air from said scroll chamber for said seal means.

7. A self-lubricating air sealed bearing apparatus as in claim 6 wherein:

said pressurized air passage means from said blower means to said seal means includes a membrane air filter between said scroll chamber air outlet ports and said seal means to further filter and clean the air blown therethrough to said seal means.

8. A self-lubricating air sealed bearing apparatus as in claim 4 wherein:

said lubricant passage means is provided with a lubricant flow restrictor comprising a membrane having a pore size of less than 1.0 micron for restricting lubricant flow to a rate of less than .001 cubic inch per hour while said engine is running and when the absolute air pressure differential between manifold vacuum and the generally atmospheric pressure at said engine air filter is between about 8 to about 12 pounds per square inch.

9. A self-lubricating bearing apparatus for use in rotatably mounting a shaft extending between a first air pressure area and a second lower air pressure area, said apparatus comprising:

bearing means for rotatably mounting a shaft at its approximate mid-portion with a first shaft end exposed to said first pressure area and a second shaft end exposed to said second lower air pressure area;

seal means spaced from said bearing means for sealing about said shaft between said shaft first end and said bearing means and for sealing said bearing means off from said first pressure area, a space between said seal means and bearing being in communication with said second lower air pressure area through said bearing means;

an enclosed lubricant supply means for retaining a supply of bearing lubricant;

a first passage means communicating between said lubricant supply means and said space between said seal means and said bearing means for supplying bearing lubricant to said bearing means at an end thereof opposite to the end exposed to said lower pressure area; and second passage means between said lubricant supply means and said first air pressure area whereby bearing lubricant is supplied to said bearing means in response to the amount of absolute air pressure differential between said first and second air pressure areas.

10. A self-lubricating bearing apparatus as in claim 9 wherein:

said first passage means is provided with bearing lubricant restrictor means for controllably restricting the flow rate of bearing lubricant to said beaing means, said restrictor comprising a membrane having a pore size of less than 1.0 micron.

11. A self-lubricating bearing apparatus as in claim 9 wherein:

said first air pressure area communicates with atmospheric pressure and said second lower air pressure area communicates with engine intake manifold vacuum of an associated interal combustion engine; and said first passage means is provided with a restrictor means for controllably restricting the flow of bearing lubricant to said bearing means when said engine is operating.

12. A self-lubricating bearing assembly for use in mounting a shaft extending between two chambers of different air pressures, opposite ends of said shaft being exposed to said different pressures, said assembly comprising:

bearing means for mounting said shaft with one bearing means end exposed to the lower pressure chamber and the other of said bearing means ends exposed to the higher pressure chamber;

an enclosed lubricant supply means having a lubricant flow passage connected to said bearing means inwardly of and adjacent said end exposed to the higher pressure chamber; and air pressure communication means for interconnecting an upper internal portion of said lubricant supply means with air pressure in said higher pressure chamber whereby lubricant flow from said lubricant supply means through said bearing means is in response to the pressure differential between said two chambers.

13. A self-lubricating bearing assembly as in claim 12 wherein:

air seal means are provided about said shaft between said bearing means one end and the associated shaft end exposed to the higher air pressure chamber of said chambers for sealing said bearing means off from said higher air pressure chamber.

14. A self-lubricating bearing assembly as in claim 12 wherein:

blower means are provided for blowing air from said higher air pressure chamber at a still higher pressure into said air pressure communication means; and said air seal means includes an inner seal chamber connected to said blower means for pressurizing the interior of said seal means against the flow of air from said higher pressure chamber through said seal means toward said lower pressure chamber.

15. A lubricating means for use with a bearing mounting a shaft extending between two areas of different air pressures, opposite ends of the bearing being exposed to said different pressures whereby air flow occurs through said bearing from the higher pressure area to the lower pressure area of said two areas, said lubricating means comprising:
- an enclosed lubricant supply means for retaining a supply of lubricant;
- first passage means between said supply means and a first end of said bearing exposed to said higher pressure area for supplying lubricant to said bearing first end; and
- second passage means between said lubricant supply means and said higher pressure area whereby lubricant is continuously forced from said supply means, through said first passage to said bearing first end and through said bearing toward said lower pressure area.

16. A lubricating means as in claim 15 wherein said first passage means is provided with a resistrictor means for controllably restricting the flow of lubricant through said first passage to a predetermined flow rate.

17. A lubricating means as in claim 16 wherein said restrictor comprises a membrane having a pore size of less than 1.0 micron for restricting oil lubricant to a flow rate of less than .001 cubic inch per hour when the pressure differential between said two areas varies between about 8 to about 12 pounds per square inch.

18. In a combination air motor and blower unit operated by the pressure differential between an associated engine intake manifold vacuum and atmospheric pressure, said air motor and blower unit having a single main shaft mounting a turbine means at one end within a sub-atmospheric pressure zone and a blower means at the other end in a generally atmospheric pressure zone, the provision of a self-lubricated bearing means comprising:
- a bearing assembly between said zones for rotatably mounting the unit main shaft;
- a lubricant chamber and lubricant passage means for communicating lubricant to said bearing assembly; and
- air passage means for communicating air pressure from said blower means to an upper interior portion of said lubricant chamber to pressurize said lubricant to cause its flow to said bearing means when and in response to the operation of said motor and blower unit when said associated engine is operating.

19. The provision of claim 18 wherein:
- said bearing assembly is provided with an air seal means on said shaft between said bearing and said generally atmospheric pressure zone;
- means for internally pressurizing said seal means by air from said blower means are provided to prevent the flow of air from said atmospheric pressure zone to said bearing means; and
- air filter means are provided for filtering the air directed from said blower means to said seal means

References Cited
UNITED STATES PATENTS

| | | | |
|---|---|---|---|
| 2,712,967 | 7/1955 | Sutton | 308—187 |
| 2,761,281 | 9/1956 | Armer | 60—39.08 |
| 3,299,629 | 1/1967 | Bouchard | 60—30 |

MARTIN P. SCHWADRON, *Primary Examiner.*

RALPH D. BLAKESLEE, *Assistant Examiner.*

U.S. Cl. X.R.

308—187; 184—6, 57; 60—11, 39.08